United States Patent
Oldenettel et al.

(10) Patent No.: US 6,237,403 B1
(45) Date of Patent: May 29, 2001

(54) METHOD FOR DETERMINING THE ROTATIONAL SPEED OF A MOTOR VEHICLE WHEEL ROTATING AROUND A ROTATING AXIS

(75) Inventors: Holger Oldenettel, Garbsen; Gerhard Ernst, Hannover, both of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/462,314

(22) PCT Filed: Jun. 25, 1998

(86) PCT No.: PCT/EP98/03900

§ 371 Date: Jan. 3, 2000

§ 102(e) Date: Jan. 3, 2000

(87) PCT Pub. No.: WO99/01302

PCT Pub. Date: Jan. 14, 1999

(30) Foreign Application Priority Data

Jul. 3, 1997  (DE) .............................. 197 28 419

(51) Int. Cl.$^7$ .................................................. B60C 23/00
(52) U.S. Cl. .................. 73/146.5; 73/146.2; 340/445
(58) Field of Search ................. 73/146.2, 146.3, 73/146.4, 146.5; 340/442, 445, 446, 447; 200/61.22

(56) References Cited

U.S. PATENT DOCUMENTS

| 4,510,484 | 4/1985 | Snyder ................................. 73/146.5 |
| 5,260,683 | 11/1993 | Tanaka et al. ....................... 73/146.5 |
| 5,409,049 | 4/1995 | Renier ................................. 152/418 |
| 5,808,190 | 9/1998 | Ernst ................................... 73/146.5 |

FOREIGN PATENT DOCUMENTS

| 196 18 658 | 11/1997 | (DE) . |
| 0 450 653 | 10/1991 | (EP) . |
| 0 517 082 | 12/1992 | (EP) . |
| WO 93/03936 | 3/1993 | (WO) . |

*Primary Examiner*—Helen Kwok
(74) *Attorney, Agent, or Firm*—Walter Ottesen

(57) ABSTRACT

The invention relates to a method for determining the rotational speed of a motor vehicle wheel (4), which rotates about a rotational axis (2), by an acceleration sensor (10). The acceleration sensor (10) is mounted on the motor vehicle wheel (4) at a spacing (r) to the rotational axis (2) in such a manner that the force-sensitive axis of the acceleration sensor (10) is perpendicular to the rotational axis and is perpendicular to the centrifugal force which acts on the acceleration sensor (10) with a rotation of the motor vehicle wheel (4) about the rotational axis (2). The rotational speed of the motor vehicle wheel (4) is measured in that the rotational axis (2) is aligned horizontally so that a periodic measurement signal is generated in the acceleration sensor (10) by the gravitational force. The frequency of the measurement signal corresponds to the rotational speed of the motor vehicle wheel (4) about the rotational axis (2). The invention also relates to an air pressure control system in which the rotational speed of the motor vehicle wheel is measured.

5 Claims, 4 Drawing Sheets

METHOD FOR DETERMINING THE ROTATIONAL SPEED OF A MOTOR VEHICLE WHEEL ROTATING AROUND A ROTATING AXIS

FIELD OF THE INVENTION

The invention relates to a method for determining the rotational speed of a wheel of a motor vehicle rotating about a rotational axis. The invention also relates to an air pressure control system wherein the rotational speed of a wheel of a motor vehicle is measured.

BACKGROUND OF THE INVENTION

From the state of the art, air pressure control systems are known for controlling the air pressure in tires of a motor vehicle. In these systems, an air pressure control device is included which is assigned to each wheel and these devices automatically measure the air pressure of the tires of the motor vehicle and announce at least a critical deviation from a desired air pressure to the driver of the motor vehicle. For this purpose, each air pressure control device transmits a measured pressure signal together with an individual identifier at regular intervals to a central unit of the motor vehicle. The transmission of an individual identifier together with the pressure signal is especially important because, in the air pressure control system, contactless data are transmitted from the wheel of the motor vehicle to the motor vehicle. Therefore, it must be precluded that air pressure data of a neighboring vehicle are received, for example, in heavy traffic and that erroneous announcements are made to the driver of the motor vehicle based on these data. This is made possible by the individual identifiers because the wheels of another motor vehicle would, of course, transmit different individual identifiers. In this central unit, value pairs of the form (identifier of the air pressure control device/wheel position) for each wheel of the motor vehicle are stored so that a conclusion can be drawn by a corresponding comparison in the central unit as to which identifier is transmitted with the corresponding pressure signal from which wheel position of the motor vehicle. A deviation of the transmitted pressure signal from a pregiven value at a wheel position is displayed to the driver of the motor vehicle by the central unit so that the driver can initiate suitable measures.

The embodiments show that an air pressure control system described above can only function without difficulty when the allocations (identifier of the air pressure control device/wheel position) are correctly stored in the central unit. Accordingly, it must, on the one hand, be ensured that this allocation does not change during the operation of the motor vehicle and, on the other hand, a new allocation must be provided after each change of tires on the motor vehicle. A method is known from U.S. Pat. No. 5,808,190 with which a new allocation can be undertaken after a change of tires on the motor vehicle. In order to carry out the method according to U.S. Pat. No. 5,808,190, it is necessary to determine the rotational speed of each wheel of the vehicle with the aid of a measurement value sensor which is disposed on the wheel of the vehicle and rotates therewith (for more information, see U.S. Pat. No. 5,808,190).

SUMMARY OF THE INVENTION

It is an object of the invention to provide a method with which the rotational speed of a wheel of a motor vehicle rotating about an axis can be determined in a simple manner with the aid of a measurement value sensor which rotates with the wheel of the motor vehicle.

According to an embodiment, the object is realized in that the wheel of the motor vehicle, which is rotatably journalled about a rotational axis, contains an acceleration sensor (or measurement value sensor) which is mounted at a radial distance to the rotational axis of the wheel of the motor vehicle and has a high force sensitivity along one of its axes. This one axis is referred to in the following as the force-sensitive axis. The acceleration sensor is so aligned that the force-sensitive axis is substantially perpendicular to the rotational axis and is substantially perpendicular to the centrifugal force which acts on the acceleration sensor with a rotation of the wheel of the motor vehicle.

With an arrangement of this kind, the method for measuring the rotational speed of the rotating wheel of the motor vehicle is carried out as follows:

the motor vehicle wheel is so aligned that the rotational axis of the motor vehicle wheel extends almost horizontally;

rotation is imparted to the motor vehicle wheel;

the rotational speed of the motor vehicle wheel is determined from the frequency of the periodic measurement signal which is generated by the acceleration sensor.

As to the substantially perpendicular alignment of the force-sensitive axis of the acceleration sensor to the rotational axis of the motor vehicle wheel and to the centrifugal force, it is to be understood that the force-sensitive axis of the acceleration sensor (apart from inaccuracies which technically cannot be avoided) is aligned precisely perpendicularly to the rotational axis of the motor vehicle wheel and to the centrifugal force.

The motor vehicle wheel includes a rim and a tire. The method for measuring the rotational speed of the motor vehicle wheel is especially simple to carry out because the rotational axis of the motor vehicle wheel is always automatically almost horizontally aligned for a traveling vehicle.

The basic idea of the invention is seen in that, with the aid of the acceleration sensor, the rotational speed of the motor vehicle wheel is determined directly. The acceleration sensor rotates with the motor vehicle wheel about the rotational axis. In this way, a measurement of the centrifugal force and a determination of the rotational speed from the centrifugal force are unnecessary. This centrifugal force acts on the acceleration sensor during the rotation of the motor vehicle wheel about the rotational axis.

The advantages achieved with the invention are especially seen in that the measurement signal of the acceleration sensor is not generated with the aid of centrifugal force but instead with the aid of the gravitational force (a more precise explanation is provided in the description of the figures). The motor vehicle wheel is rotatably journalled about an axis. The acceleration sensor therefore only has to measure small forces and can therefore have a correspondingly simple configuration. A further advantage of the invention is that the method for measuring the rotational speed of the motor vehicle wheel can still be carried out when the body rotates about the rotational axis at a higher rotational speed and the centrifugal forces become very great which act on the acceleration sensor because the centrifugal forces are not applied to determine the rotational speed.

According to another embodiment, each air pressure control device of an air pressure control system is assigned an acceleration sensor which is mounted at a radial distance r to the rotational axis of the corresponding wheel and exhibits a high force sensitivity along one of its axes. The acceleration sensor is aligned in such a manner that the force-sensitive axis is substantially perpendicular to the rotational axis and is substantially perpendicular to the centrifugal force which acts on the acceleration sensor with a rotation of the corresponding wheel. With an acceleration sensor arranged in this manner, the rotational speed of the corresponding wheels can be determined and therefore the method, which is explained in U.S. Pat. No. 5,808,190, can be carried out.

According to another embodiment of the invention, the acceleration sensor exhibits a significantly lesser force sensitivity along the axis which is perpendicular to the force-sensitive axis than along the force-sensitive axis. The advantage of this embodiment is seen in that the acceleration sensor is not easily deformable by forces which act perpendicular to the force-sensitive axis such as the centrifugal force which acts on the acceleration sensor with a rotation of the motor vehicle wheel.

According to a further embodiment of the invention, the acceleration sensor is a deflecting strip which is made of a piezoelectric material. An electrical voltage is generated when such a deflecting strip is bent. The magnitude of this voltage is clearly related to the extent of the deflection of the strip. Deflecting strips of this kind are adequately known from the state of the art so that they are not explained here. The advantage of this embodiment is seen in that deflecting strips are acceleration sensors of simple configuration and which are therefore cost effective. A further advantage of deflecting strips is that they have no mechanical stops. For this reason, a deflecting strip generates an adequately precise measurement signal with a rotation of the motor vehicle wheel even when the force-sensitive axis of the deflecting strip is not exactly perpendicular to the centrifugal force and therefore a part of the centrifugal force acts in the direction of the force-sensitive axis of the deflecting strip because the bending of the deflecting strip is simply superposed on the measurement signal. This bending of the deflecting strip is caused by the above component of the centrifugal force. Accordingly, even in this case, no mechanical stops are in the way.

According to another embodiment of the invention of claim 5, the ratio of the length of the deflecting strip to the height of the deflecting strip is greater than 2. With such a dimensioning of the deflecting strip, it is ensured that, for a bending of the deflecting strip, an adequately large electrical voltage is generated on the deflecting strip. It has been shown that a ratio of the length of the deflecting strip to the height of the deflecting strip of approximately 20 is especially advantageous.

According to another embodiment of the invention of claim 6, the deflecting strip has a length of at least 3 mm. It has been shown that a minimum length of 3 mm of the deflecting strip is necessary when there is a bending in order to generate sufficient electrical energy and a measurement signal having adequate strength. Preferably, the deflecting strip used has a length of 12 mm.

According to a further embodiment of the invention, the acceleration sensor is mounted in the base of the rim of the wheel of the motor vehicle.

BRIEF DESCRIPTION OF THE DRAWINGS

An embodiment and further advantages of the invention are explained together with the following figures wherein.

DESCRIPTION OF THE PREFERRED EMBODIMENTS OF THE INVENTION

Figure 1A:
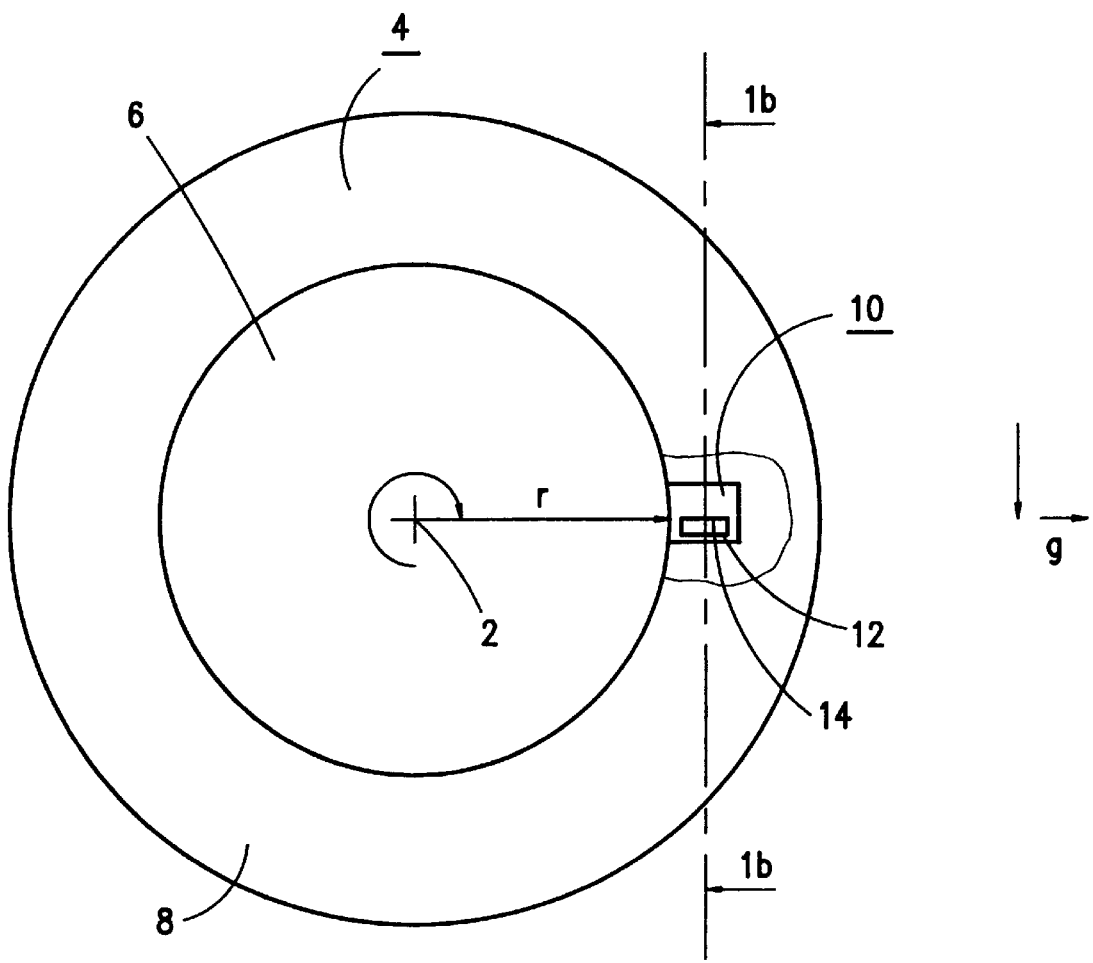
FIG. 1a–1b shows a motor vehicle wheel, which is rotatable about an axis, having an acceleration sensor.

FIG. 1 shows a motor vehicle wheel 4 rotatably journalled about an axis 2. The motor vehicle wheel 4 is made up of a wheel rim 6 and a tire 8 mounted on the wheel rim 6. An acceleration sensor 10 is mounted on the motor vehicle wheel 4 at a radial spacing r to the rotational axis 2 and is preferably arranged in the base of the wheel rim 6. In the embodiment shown, the acceleration sensor 10 comprises a base 12 on which a deflecting strip 14 of piezoelectric material is mounted. The deflecting strip 14 has a longitudinal length 1 of at least twice as much as the height h thereof. The rotational axis 2 about which the motor vehicle wheel 4 is rotatably journalled is substantially aligned horizontally so that the gravitational force (indicated in FIG. 1a by the vector g) is substantially perpendicular to the rotational axis 2.

Figure 1B:
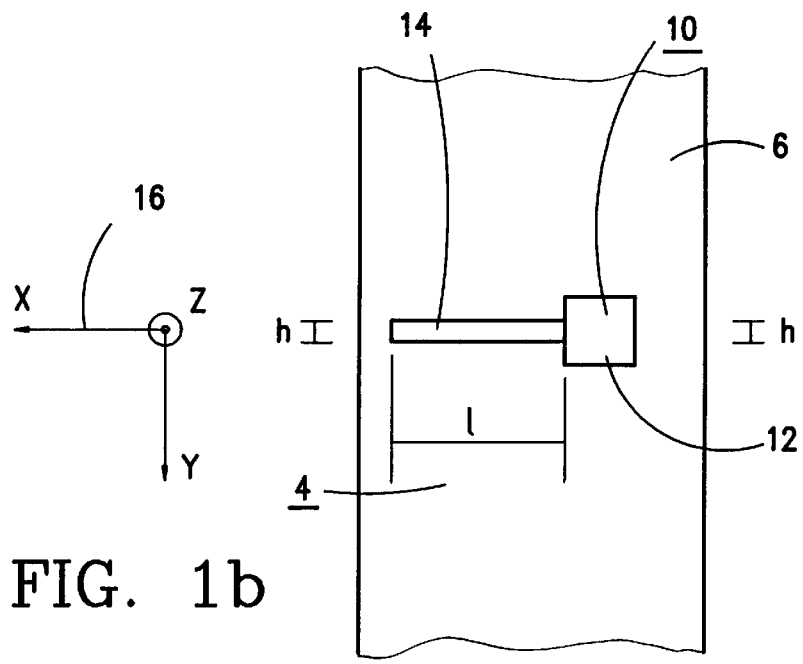

FIG. 1b shows a section view of FIG. 1a along the line shown in FIG. 1a as a dot-dash line. In FIG. 1b, an orthogonal set of axes is shown with respect to which is assumed in the following that this set of orthogonal axes rotates with the wheel for a rotation of the motor vehicle wheel 4 about the rotational axis 2 (not shown in FIG. 1b) in the direction of the arrow which is shown next to the orthogonal set of axes. From FIG. 1b, it can be seen that the acceleration sensor 10 is mounted in the base of the wheel rim 6 and that the longitudinal length 1 of the deflecting strip 14 runs in the direction of the x-axis of the orthogonal set of axes. The rotational axis 2 (not shown in FIG. 1b) likewise runs in the direction of the x-axis of the orthogonal set of axes. Correspondingly, the centrifugal force is always directed in the direction of the z-axis of the orthogonal set of axes 16. The centrifugal force operates on the acceleration sensor 10 with a rotation of the motor vehicle wheel 4 about the axis 2. The acceleration sensor 10 is mounted on the motor vehicle wheel 4 in such a manner and especially in the base of the wheel rim 6 that the force-sensitive axis of the deflecting strip 14 runs along the y-axis of the orthogonal set of axes 16 and thereby is perpendicular to the rotational axis 2 and aligned to the centrifugal force. In the embodiment shown in FIG. 1b, this is achieved in that the longitudinal length 1 of the deflecting strip 14 runs in the direction of the x-axis of the orthogonal set of axes 16. The arrangement of the deflecting strip 14 shown in FIG. 1 in the base of the wheel rim 6 is especially advantageous because the deflecting strip 14 does not project far into the tire 8 of the motor vehicle wheel 4.

Figure 2A:
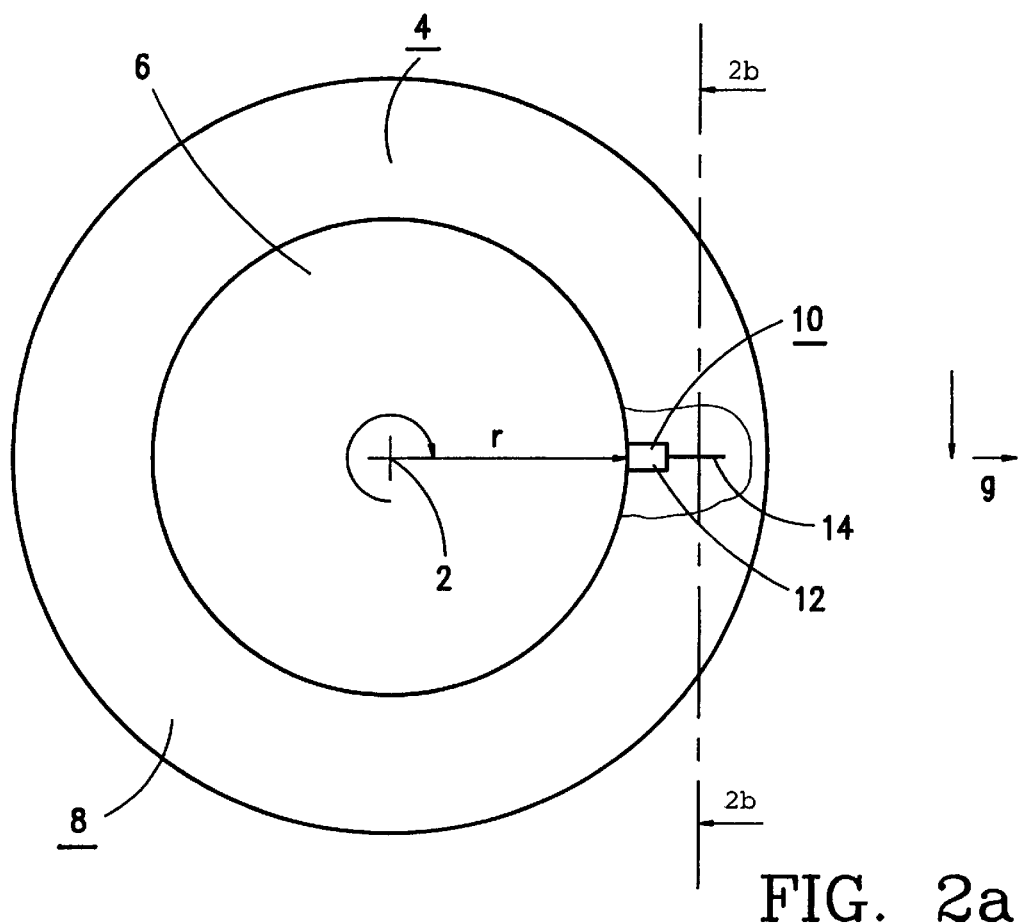
FIG. 2a–2b shows a motor vehicle wheel, which is journalled about an axis, having an acceleration sensor.
Figure 2B:
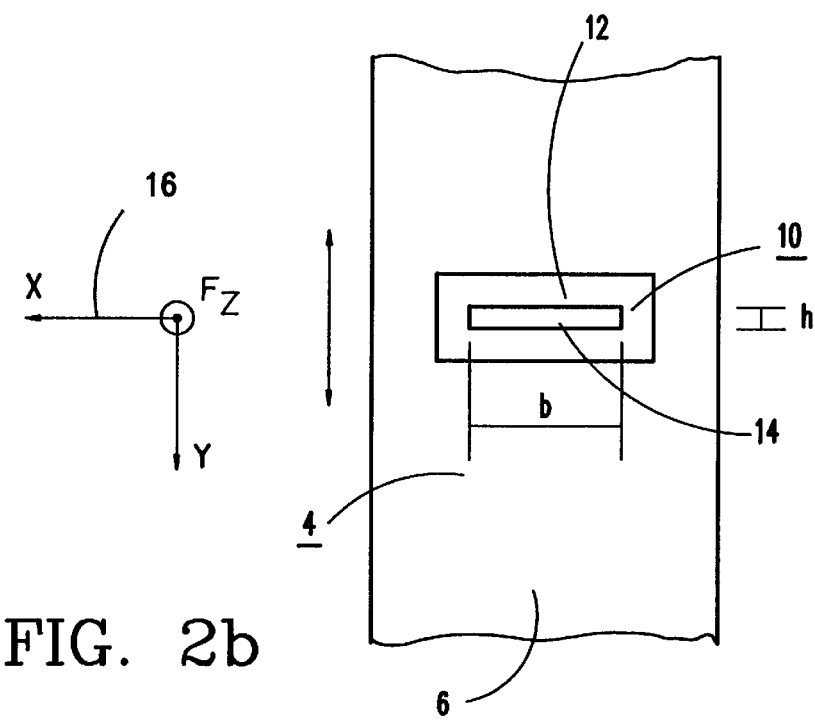

FIG. 2 shows substantially the same as FIG. 1. The only difference is that the acceleration sensor 10 is mounted on the motor vehicle wheel 4 and especially in the base of the wheel rim 6 so that the longitudinal direction of the deflecting strip 14 runs along the z-axis of the orthogonal set of axes 16 (see FIG. 2a and FIG. 2b). In this case too, the force-sensitive axis of the deflecting strip 14 runs in the direction of the y-axis of the orthogonal set of axes 16 and therefore is perpendicular to the rotational axis 2 and to the centrifugal force which operates on the acceleration sensor 10 with a rotation of the motor vehicle wheel 4 about the rotational axis 2. Such an alignment of the force-sensitive axis of the deflecting strip 14 is always given (generally formulated) when the longitudinal length 1 of the deflecting strip 14 lies in the plane which is conjointly defined by the rotational axis 2 and by the centrifugal force operating on the acceleration sensor 10. The acceleration sensor 10 can therefore also assume any desired intermediate position between the position shown in FIG. 1 and in FIG. 2.

Figure 3:
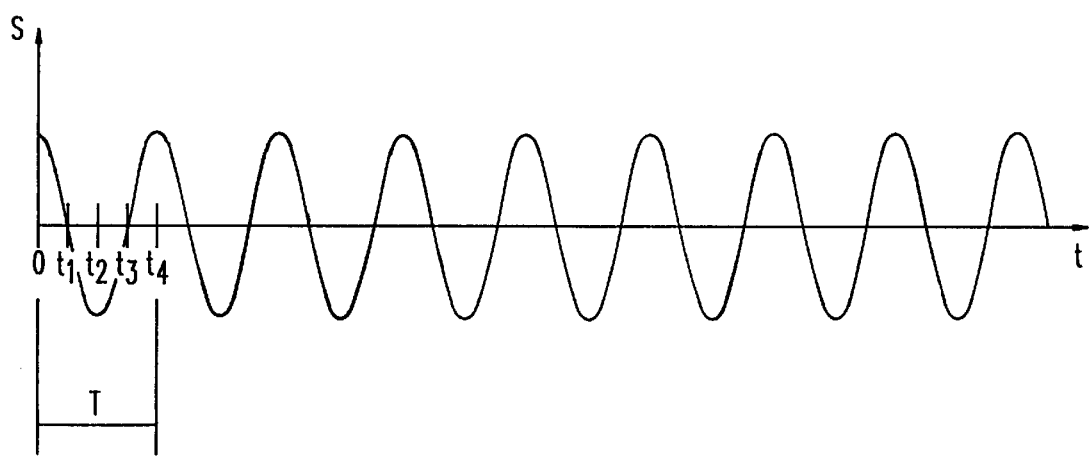
FIG. 3 is a diagram.

With respect to FIG. 1a and FIG. 3, it will now be explained how the rotational speed of the motor vehicle wheel 4, which rotates about the rotational axis 2, is determined with the aid of the acceleration sensor 10 mounted on the motor vehicle wheel 4. In the position of the acceleration sensor 10 shown in FIG. 1a, the gravitational force g runs in the direction of the force-sensitive axis of the deflecting strip 14 so that the strip 14 experiences a maximum bending by the gravitational force g and therefore generates a maximum signal at time point t=0 (see FIG. 3). When the motor vehicle wheel 4 rotates by 90° about the rotational axis 2 out of the position shown in FIG. 1a, then the force-sensitive axis of the deflecting strip 14 and the gravitational force g are perpendicular to each other so that the deflecting strip 14 experiences no deformation whatsoever because of the gravitational force g and the signal, which is generated at time point t=$t_1$ by the deflecting strip 14, thereby vanishes. After a further rotation of the motor vehicle wheel 4 about a further 90°, the force-sensitive axis of the deflecting strip 14 extends again in the direction of the gravitational force g so that the deflecting strip 14 is again maximally deformed by this gravitational force g whereby, however, the deformation is now opposite to the deformation which results in the position shown in FIG. 1a. Correspondingly, the deflecting strip generates a signal at time point t=$t_2$ which has the same magnitude as at time point t=$t_0$ but has a negative sign. After a rotation of a further 90°, the force-sensitive axis of the deflecting strip 14 is again perpendicular to the gravitational force g so that no signal is generated by the deflecting strip 14 at time point t=$t_3$. After a rotation of the motor vehicle wheel 4 about the rotational axis 2 by a further 90°, the position of the acceleration sensor 10 shown in FIG. 1a is again reached so that the force-sensitive axis of the deflecting strip 14 extends again in the direction of the gravitational force g so that the deflecting strip 14 is again maximally deformed by the gravitational force g and a maximum signal is again generated at time point t=$t_4$. For a rotation of the motor vehicle wheel 4 about the horizontally extending rotational axis 2, a periodic measurement signal is therefore generated by the acceleration sensor 10. The frequency of the signal corresponds to the rotational speed of the motor vehicle wheel (rotations per unit of time).

Figure 4:
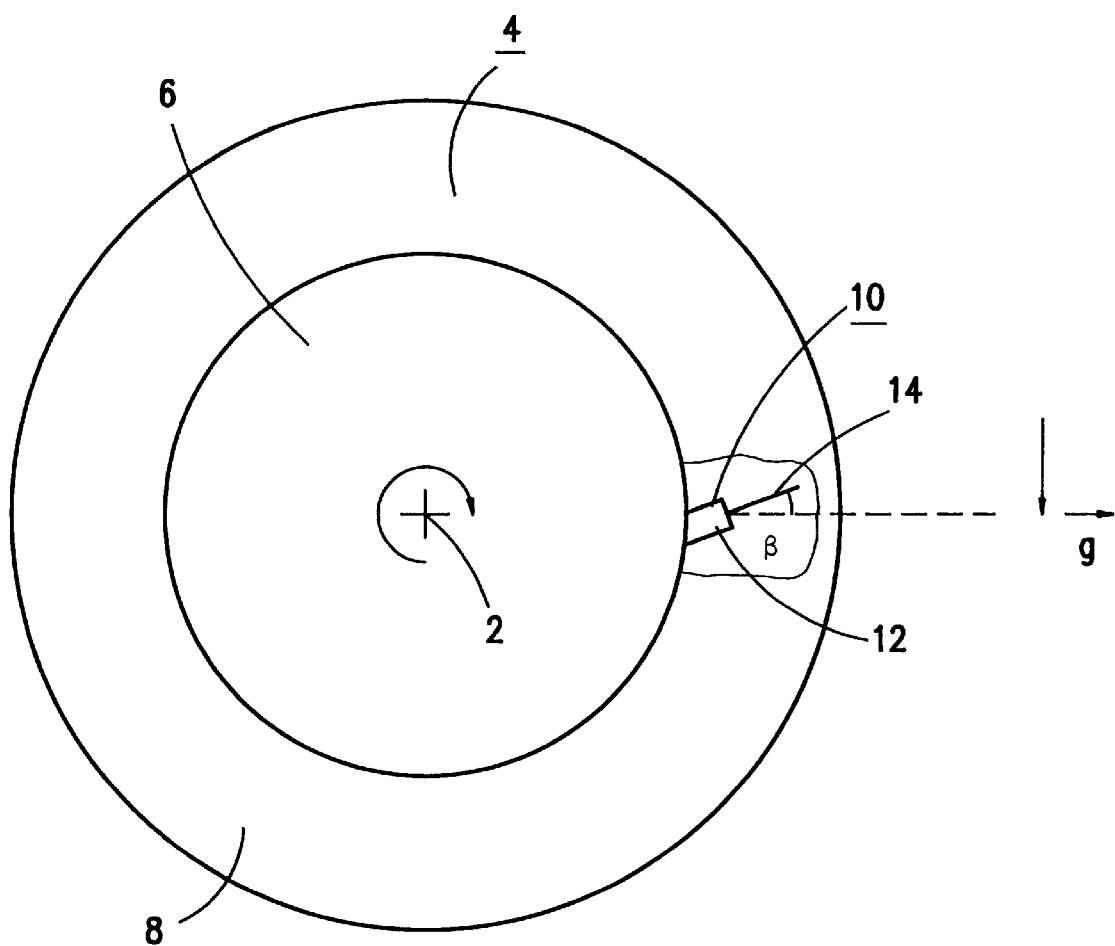
FIG. 4 shows a motor vehicle wheel which is rotatably journalled about an axis; and, FIG. 5 is a diagram.
Figure 5:
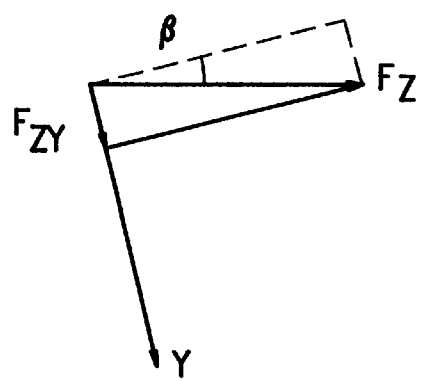

In connection with FIGS. 4 and 5, it is now explained how the measuring range of the acceleration sensor 10 is fixed. As already explained initially, it is not possible for technical reasons to mount the acceleration sensor 10 in the motor vehicle wheel in such a manner that the force-sensitive axis of the acceleration sensor 10 is exactly perpendicular to the centrifugal force which operates on the acceleration sensor 10 with a rotation of the motor vehicle wheel 4 about the rotational axis 2. Rather, there is a small deviation by the angle β which is approximately 10. The centrifugal force $F_Z$ therefore exhibits a component $F_{ZY}=F_Z \sin β$ (see FIG. 5) in the direction of the force-sensitive axis of the acceleration sensor 10. This component of the centrifugal force operates continuously along the force-sensitive axis of the acceleration sensor 10 so that the deflecting strip 14 is continuously deformed by this component of the centrifugal force. The measuring range of the acceleration sensor 10 or of the deflecting strip 14 is therefore to be dimensioned such that the deflecting strip still can measure the gravitational force with adequate accuracy notwithstanding the deformation by the centrifugal force component in the direction of the force-sensitive axis. If the computation now shows, for example, that for a maximum rotational speed of the motor vehicle wheel 4 about the rotational axis 2, at which the rotational speed is still to be measured, the centrifugal component acting along the force-sensitive axis of the acceleration sensor 10 corresponds to 10g, then the measuring range of the acceleration sensor should be so dimensioned that it measures at least 11g.

List Of Reference Numerals 2 rotational axis
4 motor vehicle wheel
6 wheel rim
8 tire
10 acceleration sensor
12 mount
14 deflecting strip
16 orthogonal set of axes

What is claimed is:

1. An air pressure control system for a motor vehicle having wheels with each wheel being rotatably journalled about a rotational axis and rotating at a number of revolutions per unit of time, the system comprising:

a plurality of air pressure control devices assigned to said wheels, respectively;

each of said air pressure control devices including an acceleration sensor to measure said number of revolutions;

said acceleration sensor being mounted at a spacing (r) to said rotational axis with said acceleration sensor being subjected to centrifugal force as the wheel rotates about said rotational axis;

said acceleration sensor defining a force-sensitive axis and exhibiting a high sensitivity to force along said force-sensitive axis;

said acceleration sensor being aligned so that said force-sensitive axis is substantially perpendicular to said rotational axis and substantially perpendicular to said centrifugal force so that said acceleration sensor generates a periodic measuring signal under the influence of the gravitational force when said wheel rotates about said rotational axis with said number of revolutions being determinable from the frequency of said periodic measuring signal;

said rotational axis and said centrifugal force conjointly defining a plane;

said acceleration sensor being a deflecting strip made of piezoelectric material and having a longitudinal length (l); and, said deflecting strip being so mounted on said wheel that said longitudinal length (l) is in said plane.

2. The air pressure control system of claim 1, wherein said deflecting strip has a height (h) and said length (l) and said height (h) defining a ratio of length (l)/height (h) greater than 2.

3. The air pressure control system of claim 2, wherein said length (l) is at least 3 mm.

4. The air pressure control system of claim 1, wherein said wheel includes a wheel rim defining a wheel rim base and said acceleration sensor being mounted in said wheel rim base.

5. A method of measuring the number of revolutions per unit of time of a wheel of a motor vehicle with said wheel being rotatably journalled about a rotational axis, the method comprising the steps of:

providing an acceleration sensor in the form of a deflecting strip made of piezoelectric material and mounting said acceleration sensor at a radial spacing (r) to said rotational axis with said acceleration sensor defining a force-sensitive axis along which said acceleration sensor exhibits a high sensitivity to force and with said acceleration sensor being subjected to centrifugal force as said wheel rotates about said rotational axis;

aligning said acceleration sensor so that said force-sensitive axis is substantially perpendicular to said is rotational axis and substantially perpendicular to said centrifugal force;

aligning said wheel so that said rotational axis extends almost horizontally;

imparting rotation to said wheel about said rotational axis and said rotational axis and said centrifugal force conjointly defining a plane;

determining said number of revolutions of said wheel from the frequency of a periodic measuring signal generated by said acceleration sensor under the influence of the gravitational force; and, mounting said deflecting strip on said wheel so that the longitudinal length of said deflecting strip lies in said plane so that said deflecting strip generates said periodic measuring signal because of the deformations produced by the gravitational force while said wheel rotates.

* * * * *